F. GRINNELL.
Car-Axle-Box Cover.

No. 91,115.  Patented June 8, 1869.

Witnesses.

Inventor:
F. Grinnell.

United States Patent Office.

FREDERICK GRINNELL, OF MEADVILLE, PENNSYLVANIA, ASSIGNOR TO N. C. MILLER AND S. R. DUMMER, OF NEW YORK CITY.

Letters Patent No. 91,115, dated June 8, 1869; antedated December 8, 1868.

IMPROVED AXLE-BOX COVER.

The Schedule referred to in these Letters Patent and making part of the same.

*To all whom it may concern:*

Be it known that I, FREDERICK GRINNELL, of Meadville, in the county of Crawford, and State of Pennsylvania, have invented a new and useful Improvement in Securing Lids to Car-Axle Boxes; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

This invention consists in the arrangement of an open slot at one edge of the cover, in combination with an oblong slot at the opposite edge, and with the screw-bolts, which serve to fasten the cover down upon the box in such a manner, that when the screw-bolts are released, the cover can be moved in the direction of the oblong slot, and then swung open without taking off the nuts entirely from the bolts, thereby enabling me to spread the ends of the bolts, and avoiding all danger of losing the covers, since, by spreading the ends of the bolts the nuts are prevented from working out spontaneously by the jar of the car. The same result is obtained by providing the cover at one end with a slot, opening sideways, and hanging it, at the opposite end, on a screw-pivot, so that, if both screws are released, the cover can be freely turned on its pivot.

A represents the cover of an axle-box, B. This cover is provided at one end with an open slot, $a$, and at its opposite end with an oblong slot, $b$, which may be curved, angular, or rectilinear. Said cover is secured to the box by screw-bolts $c\,c'$ and nuts $d\,d'$.

Figure 1:
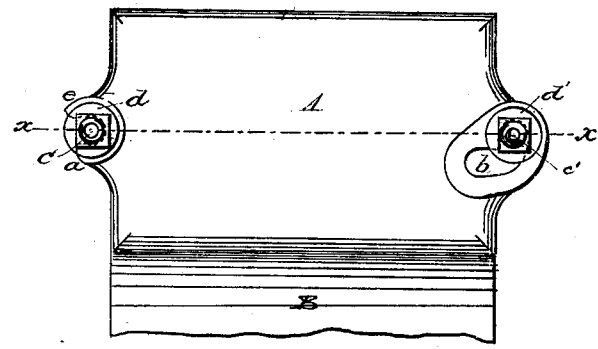
Figure 1 represents an end view of this invention, when the lid or cover is closed.
Figure 2:
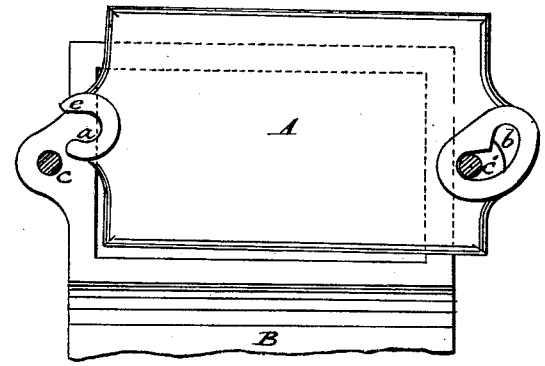
Figure 2 is a similar view thereof when the cover is partly open.

If the nuts are turned back, so as to release the cover, said cover can be moved out in the oblong slot $b$, from the position which the same occupies in fig. 1, to that which it occupies in fig. 2, leaving it free to be swung round on the bolt $c'$, so as to give free access to the interior of the box.

Figure 3:
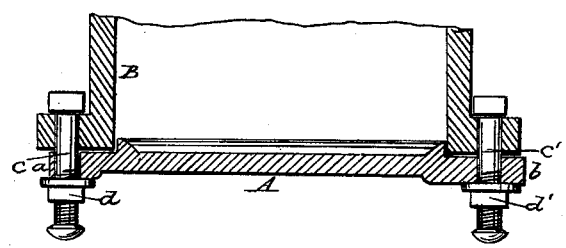
Figure 3 is a horizontal section thereof, the line $x\,x$, fig. 1, indicating the plane of section.

This operation can be performed without taking off the nuts entirely from their bolts, and the ends of the bolts can therefore be spread out or enlarged, as shown particularly in fig. 3, so that the nuts are prevented from working off spontaneously by the jar of the car, and the loss of the cover, so frequent with the ordinary mode of securing the same, is effectually prevented.

The oblong slot $b$ is, by preference, made angular, as shown in figs. 1 and 2, and the open slot $a$ is provided with a projecting lip, $e$, so that when the nuts are left loose by carelessness, or when they should work loose by the jar of the car, and the cover should be thrown in the position shown in fig. 2, it is free to swing up, but it cannot drop down, being prevented by the projecting lip $e$, which bears on the bolt $c$, and at the same time, by giving to the slot $b$ an angular form, the cover, when brought to the position shown in fig. 2, has a tendency to return to its closing position by its inherent gravity, and when closed it is less liable to be thrown open by the jar of the car than it would be if the oblong slot were made rectilinear.

The open slot $a$ might also be so arranged that its mouth or opening turns downward, and in this case the slot $b$ might be made round to fit its screw-bolt.

By releasing the nuts, the cover can be swung on the bolt $c'$, and the box can be opened without removing the nuts from their bolts.

Having thus described my invention,

What I claim as new, and desire to secure by Letters Patent, is—

1. The arrangement of the oblong slot $b$ in one end of the cover A, in combination with the open slot $a$ in the opposite end, and with the screw-bolts $c\,c'$, substantially as and for the purpose described.

2. The projecting lip $e$, on the open slot $a$, in combination with the angular slot $b$, in the cover A, and with the screw-bolts $c\,c'$, substantially as and for the purpose set forth.

FREDK. GRINNELL.

Witnesses:
LAWRENCE GRINNELL,
T. A. McFARLAND.